United States Patent
Handte

(10) Patent No.: US 7,351,273 B2
(45) Date of Patent: Apr. 1, 2008

(54) APPARATUS AND METHOD FOR SEPARATING DUST CONSTITUENTS OUT OF AN EXPLOSIVE DUST-AIR MIXTURE

(75) Inventor: Siegfried Handte, Bodman-Ludwigshafen (DE)

(73) Assignee: Handte Umwelttechnik GmbH, Tuttlingen (DE)

( * ) Notice: Subject to any disclaimer, the term of this patent is extended or adjusted under 35 U.S.C. 154(b) by 389 days.

(21) Appl. No.: 10/978,213

(22) Filed: Oct. 28, 2004

(65) Prior Publication Data

US 2006/0236855 A1 Oct. 26, 2006

(30) Foreign Application Priority Data

Oct. 28, 2003 (DE) ................ 103 50 395

(51) Int. Cl.
*B01D 46/46* (2006.01)
*B01D 46/00* (2006.01)

(52) U.S. Cl. ............ 95/1; 95/273; 95/278; 95/285; 96/405; 96/408; 96/417; 96/425; 55/283; 55/337; 55/429; 55/524; 55/DIG. 34

(58) Field of Classification Search ........ 95/273, 95/274, 275, 276, 278, 279, 280, 285, 268, 95/1; 96/397, 398, 408, 417, 421, 424, 425, 96/428, 405; 55/283, 302, 337, 466, 467, 55/524, 428, 429, DIG. 34
See application file for complete search history.

(56) References Cited

U.S. PATENT DOCUMENTS 3,780,502 A * 12/1973 Dupre et al. ............... 55/337
4,224,043 A * 9/1980 Dupre ...................... 55/319
4,229,189 A * 10/1980 Pircon ...................... 95/214
4,411,674 A * 10/1983 Forgac ..................... 55/304
4,464,184 A * 8/1984 Cera et al. .................. 95/19
4,790,865 A * 12/1988 DeMarco ................... 55/337
4,865,629 A * 9/1989 Zievers et al. ............ 95/268
5,022,897 A * 6/1991 Balcar et al. ............. 95/279
5,868,807 A * 2/1999 Luy et al. .................. 55/302
6,569,217 B1* 5/2003 DeMarco ................... 55/324
6,942,717 B2* 9/2005 Armstrong et al. ......... 95/26
2004/0020364 A1* 2/2004 Koclejda et al. .......... 95/273

FOREIGN PATENT DOCUMENTS

DE 299 14 378 U1 11/1999
EP 1 270 060 A1 1/2003

* cited by examiner

*Primary Examiner*—Duane Smith
*Assistant Examiner*—Robert A Clemente
(74) *Attorney, Agent, or Firm*—Darby & Darby P.C.

(57) ABSTRACT

A method and an apparatus (10) for separating dust constituents out of an explosive dust-air mixture which is passed through a filter housing (26) with filter elements having filter surfaces use a dust container (64), which can be connected in a gastight manner to the filter housing (26), contains inert additive particles (60), into which the process dust produced as a result of the filter surfaces being cleaned down drops and from which the additive particles (60) can be blown onto the filter surfaces by means of compressed air (138). There is a weighing device (122, 124) for the dust container (64).

34 Claims, 2 Drawing Sheets

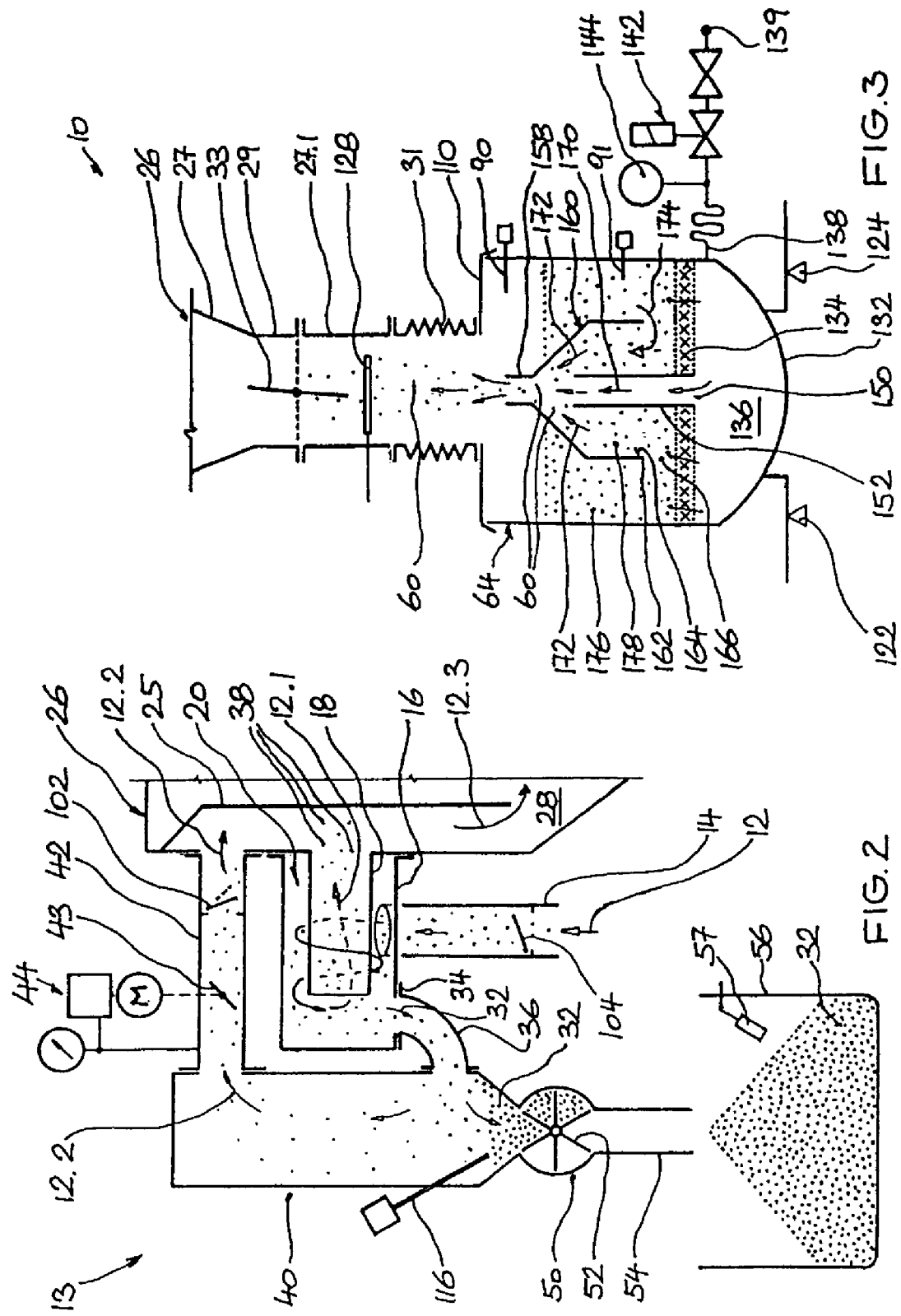

APPARATUS AND METHOD FOR SEPARATING DUST CONSTITUENTS OUT OF AN EXPLOSIVE DUST-AIR MIXTURE

TECHNICAL FIELD

The invention relates to a method and an apparatus which allow dust constituents to be separated out of an explosive dust-air mixture without danger. Examples of dust constituents of this type include aluminum dusts and aluminum chips as are produced on corresponding grinding and chip-forming machine tools. If the dust-air concentration is high enough, these dust constituents produce a combustible or explosive dust-air mixture.

Dry separators of pressure-resistant design, which are provided with relief surfaces and discharge passages such that any superatmospheric pressure which occurs can be discharged to atmosphere without danger, can be used to separate off combustible or explosive dusts of this type. Another possible option for separating off dusts of this type consists in providing pressure-resistant dry separators with explosion prevention by means of inert extinguishing agents.

PRIOR ART

EP 1 270 060 A1 has disclosed an apparatus for separating solids out of a gaseous medium, in which the formation of explosive dust-air mixtures is prevented by the addition of inert substances.

The dry separator, which is designed as a compact unit, is categorized as German Explosion class ST 1. This makes it possible for the dry separator to be designed to be pressure-resistant down to approximately 0.1 bar and for any explosion pressure which may be generated to be dissipated to the working space by means of a pressure relief device. Therefore, on account of the fact that there is no need for a connection to exhaust-air passages leading out into the open, the dry separator can be set up inside working spaces at any desired, including changeable, inner areas of the working space.

This dry separator can be used to separate aluminum chips out of the exhaust air in an economically acceptable way. These aluminum chips can be fed for recycling. This is very important since aluminum-processing machines, for cost-saving reasons, are increasingly working under dry conditions or, for example, with a minimum quantity of lubrication.

In the dry separator, there are two classification operations provided for separating the coarse chips out of the exhaust air which is to be purified. A first classification is carried out by means of a cyclone. Within the cyclone the coarser and therefore heavier particles in the untreated air are thrown outward and separated off through an opening which is present in the outer wall of the cyclone. The residual air, laden with finer dust fractions, in the interior of the cyclone is fed centrally to subsequent fine filtering, this air previously having been mixed with additive particles.

The coarse chip particles separated out of the cyclone are classified a further time. This takes place in an air classifier. Within this air classifier, chip particles can be separated off by the force of gravity as a result of their different weight. By way of example, in the case of aluminum dusts, it is possible for chips with a diameter of greater than 0.5 mm to be economically recycled. Chips of such a size are therefore definitively separated out of the dry separator by the second classification.

The remaining dust and small chip-air mixture cannot be reused on account of it being mixed with inert additive particles. This mixture is passed over a fine filter and can be returned to the working space as clean air. The dust-additive mixture settles on the filter surface and drops into a suitably positioned dust container when the filters are shaken.

This dust container, in which the process dusts which are cleaned off during the cleaning operation are collected, has level meters on the one hand for determining the quantity of additive particles present in the dust container at the start of its use and on the other hand for determining a maximum permissible level for the quantity of particles mixed with cleaned-off process dust and additive particles. When the maximum level is reached in the dust container, the latter has to be exchanged for a new dust container.

It has emerged that an explosion prevention measure of this type aimed at avoiding an explosive atmosphere in the filter housing, on the one hand, and in the dust container, on the other hand, can be regarded as sufficient for most operating states which generally occur in the corresponding factories and workshops.

SUMMARY OF THE INVENTION

Working on the basis of this prior art, the invention is based on the object of providing an optimum way of separating dust constituents out of an explosive dust-air mixture.

A method according to the invention for separating off dust constituents of this type is disclosed. An apparatus according to the invention for carrying out a method of this type is also disclosed. Expedient refinements of both the method according to the invention and the apparatus according to the invention is further disclosed.

The invention is based on the discovery that the percentage by weight of dust in a dust-air mixture is a crucial factor in ensuring that the dust-air mixture cannot explode, and that therefore it is the contents by weight of the dust-air mixtures formed during cleaning which should primarily be referred to. Consequently, instead of monitoring the dust-air mixture in the dust container exclusively by means of level sensors, according to the invention it is not the filling levels but rather the corresponding weights of the dust container, and therefore the weight of the particles present in the dust container, which are used as a basis for an explosion-proofing concept.

In the method according to the invention, the weight of the dust container is weighed after the filter surfaces of the fine filter have been "laden" with a sufficient quantity of additive particles when a container containing additive particles is used for the first time, and the container weight which then increases during the cleaning process as result of dusts dropping into the container is established. When an increased weight of the dust container which occurs during the cleaning operation is reached or exceeded or when a predetermined service life of the dust container has elapsed, it then possible to provide suitable measures enabling the further separation operation to be terminated without danger.

The cleaning operation according to the invention is particularly suitable for cleaning off aluminum dusts and aluminum chips. The additive particles used may consist of silicon dioxide and calcium carbonate (lime). The lime is composed in particular of limestone powder and trass powder, in a ratio of 85 percent by weight to 15 percent by weight.

To ensure sufficient loading of the filter surfaces with additive particles, on the one hand when starting a cleaning operation with the aid of a dust container which is being used for the first time or has just been introduced in an exchange operation, and on the other hand after each cleaning operation, and therefore to ensure that a dust-air mixture is not explosive in the region of the filter surfaces, it may be useful to determine the weight of the dust container before it is used for the first time and then to allow the loading to continue as a result of corresponding introduction of compressed air into the dust container until a correspondingly lower weight has been established for the dust container as a result of a corresponding quantity of additive particles being blown out.

The weight difference determined then corresponds to the weight of the additive particles blown out of the dust container and into the filter. As an alternative or in addition, it is also possible for additive particles to be blown out of the dust container for a predetermined period of time. Previous tests have made it possible to establish what quantity of particles is blown out of the container in what period of time. The weight of the additive particles blown out can then also be determined by means of the period of time.

To ensure that the weight of the container has also been determined correctly, it has proven expedient for the weighing results in terms of the corresponding weight of the dust container to be checked for correctness. This checking can be effected by the dust container being weighed by means of a plurality of weighing devices simultaneously, so that the weight of the dust container can be determined from the partial weights of the weighing devices. Working on the realistic assumption that the container will be uniformly filled with process dust in terms of its cross section and that additive particles will be blown out of it uniformly, the respective partial weights of the weighing devices which are present are in each case in a defined relationship with one another. If the actual relationships of the partial weights deviate from the set relationships by more than a predetermined tolerance value, it is possible to emit a fault message, so that measures are taken to terminate further operation of the separation apparatus without danger.

To allow the loading of the filter surfaces always to be carried out in the same way for the filter surfaces, it is expedient for the filter surfaces, before they are loaded, first of all to be cleaned down and only then to be loaded with additive particles. In this way, it is possible always to start from the same quantity of additive particles on the filter surfaces.

While a dust container is in use, the filter surfaces are regularly cleaned a number of times, in particular approximately three times per operating hour. After they have been cleaned, additive particles from the dust container are applied to the filter surfaces. This inerting operation, i.e. the loading of the filter surfaces with additive particles, therefore alternates with the cleaning of the filter surfaces.

It has emerged that it is possible without danger to continue to operate the machine installation producing the explosive dust-air mixture while a used dust container is being exchanged for a new dust container, rather than having to interrupt operation of the machine installation. However, the exchange operation has to take place within a defined period of time. If this period of time is exceeded, it is once again possible to provide a fault message, resulting in the initiation of measures to interrupt further operation of the installation.

In terms of safety aspects, it is expedient to monitor the operation pressure of the compressed air introduced into the dust container. It is also expedient to monitor the power of the fan which is installed for discharging the clean air leaving the filter housing into the exhaust-air line and which can preferably also be used to pass the dust-air mixture through the filter housing and to emit a fault message if this power drops below a predetermined limit value.

To prevent deposits of dust particles in the filter housing and in the upstream and downstream housing parts and pipelines, it is possible to provide for the exhaust-air fan to continue to operate for a certain time in the event of an interruption to the flow of the dust-air mixture into the filter housing. The permeability of the filter surfaces and therefore the functioning of the filter can also be checked, for example by determining the pressure on the untreated-gas side and the clean-gas side of the filter surfaces. If predetermined pressure limit values are exceeded, it is once again possible to emit a fault message, with the consequences which have already been outlined above.

If the dust-air mixture to be purified contains only fine dust particles, these particles can be introduced directly into the filter housing. If the dust-air mixture is also laden with chips, it is expedient first of all for the chips to be separated out of the dust-air mixture in suitable preliminary separators, with the remaining dust-air mixture only then being introduced into the filter container.

Further features of the invention, in particular also relating to the apparatus according to the invention which utilizes the method according to the invention, are to be found in the features listed in more detail in the claims and the exemplary embodiment below.

BRIEF DESCRIPTION OF THE DRAWING

The invention is described and explained in more detail below on the basis of the exemplary embodiment illustrated in the drawing, in which:

FIG. 2 shows a partial view including the preliminary separator of the separation apparatus shown in FIG. 1, FIG. 3 shows a partial view including the dust container of the separation apparatus shown in FIG. 1.

WAYS OF CARRYING OUT THE INVENTION

Figure 1:
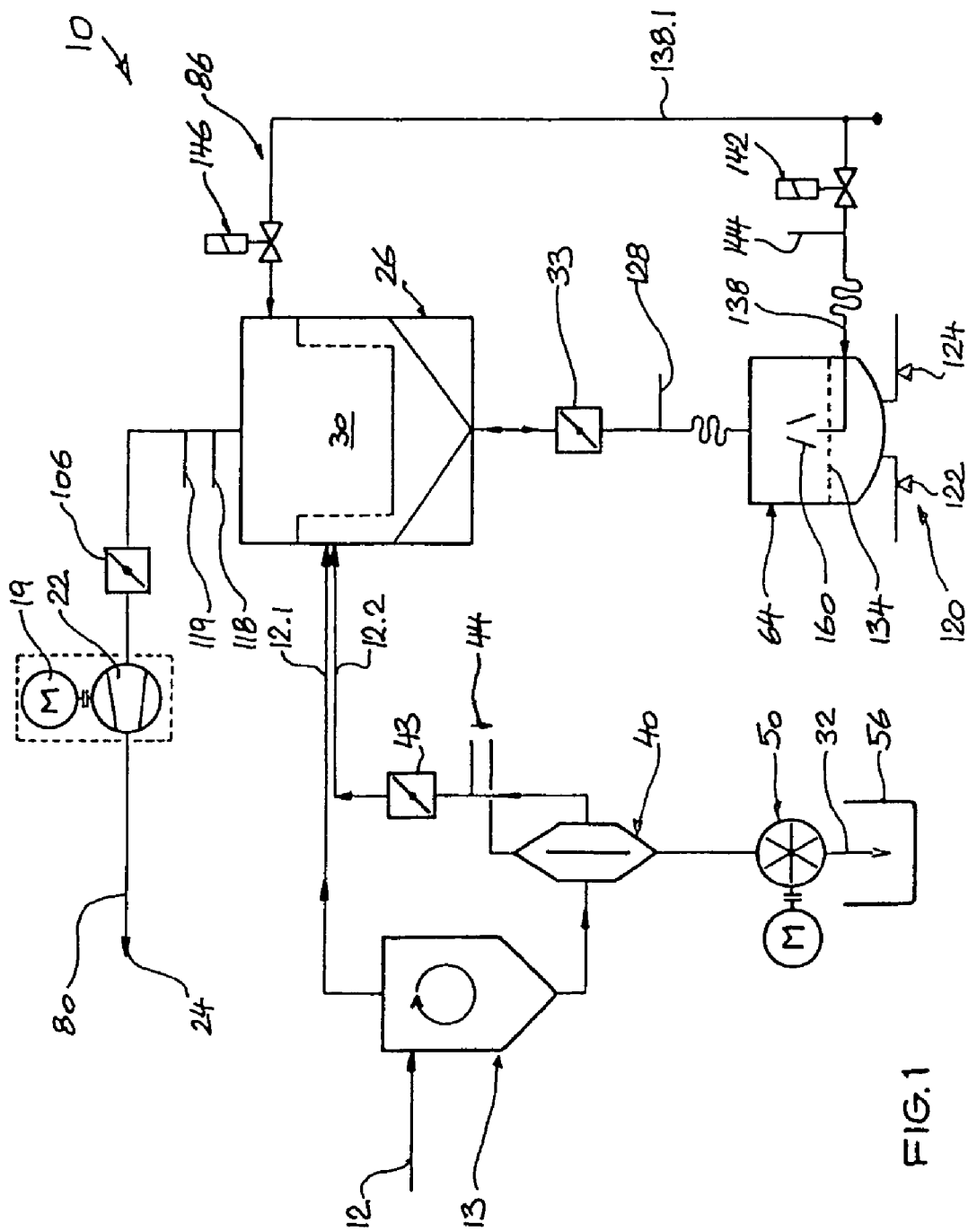
FIG. 1 shows a circuit diagram for the separation of dust constituents out of an explosive dust-air mixture, using a separation apparatus, which includes a filter housing with a plurality of filter plates, a dust container, which is to be arranged exchangeably beneath the filter housing and is filled with inert additive particles, and a preliminary separator, which is connected upstream of the filter housing on the entry side and has a cyclone preliminary separator, with an air classifier and with a star feeder.

A separation apparatus 10 is connected to a machine tool (not shown in the drawing). Aluminum is machined on this machine tool by means of grinding and chip-forming manufacturing processes under dry conditions or with only a minimal quantity of lubrication.

The separation apparatus 10 separates these aluminum dusts and aluminum chips, which may be laden with oil and emulsion aerosols, out of the untreated air 12 which leaves the machine tool and is fed to the separation apparatus 10.

The untreated air 12, which is in the form of a dust-air mixture, and the dust constituents of which, in the present example shown in FIG. 1, also contain chips, is first of all passed through a preliminary separator 13, which separates the chip constituents out of the untreated air 12. Only the untreated air 12 from which chips have as far as possible been removed is then passed through filter plates 30 which are present in a filter housing 26. The air which then leaves the filter housing 26 is either released to the open air as clean air 24 or recycled as return air to the machine tool. The dusts which accumulate in the interior of the filter housing 26 and have been separated out of the untreated air are collected in a dust container 64, as is described in more detail below.

The preliminary separator 13 (FIG. 2) has a suction tube 14, through which the untreated air 12 is sucked into the preliminary separator 13. The suction tube 14 opens out tangentially into an outer tube 16 which, together with an inner tube 18 (immersion tube), forms a preliminary separator in the form of a cyclone 20. The untreated air 12 is sucked through the separation apparatus 10 by a fan 22, which is installed at an end side of the separation apparatus 10, in the exhaust-air line 80, is operated by means of a motor drive 19 and in the present example is a radial fan.

A cyclone 20 of this type is in principle known from DE 299 22 658 U1. In the cyclone 20, the untreated air 12, which is laden with chips and dust particles, is introduced tangentially into the outer tube 16 of the preliminary separator 13. The untreated air 12 rotates around in the outer tube 16 and then flows through the inner tube 18 into the interior space 28 of the filter housing 26. A plurality of filter plates 30 of a known design are arranged parallel to and next to one another in the interior space 28, and the mixture flows through them from the outside inward. On the entry side, a protective metal plate 25, which protects the filter plates and ensures optimum flow onto the filter plates, is arranged in the filter housing 26.

In the cyclone 20, the heavy constituents of the untreated air 12, such as for example the heavier chips 32, are thrown radially outward in the outer tube 16 and pass into a connection line 36 through a connection piece 34 which is tangentially connected to the outer tube 16. The lighter constituents of the untreated air 12, such as the, for example, lighter chips and dust particles 38, are sucked through the inner tube 18 into the interior space 28 of the filter housing 26.

The connection line 36 leads into the lower region of an air classifier 40. Air flowing through the connection line 36 and laden in particular with relatively heavy chips 32 flows through the air classifier 40 from the bottom upward. This air 12.2 flows out of the air classifier 40 at the top and into a feed line 42, which likewise opens out into the interior space 28 of the filter housing 26.

In the feed line 42 there is a throttle flap 43 as part of a vacuum control 44 which can be used to control the vacuum in the feed line 42 and therefore in the air classifier 40 in such a way that the heavier constituents of the untreated air 12.2 passed through the air classifier 40 drop downward in the air classifier 40 and only correspondingly lighter contaminants in the untreated air 12.2 are passed up through the air classifier 40 and then introduced into the interior space 28 of the filter housing 26 through the feed line 42.

In the air classifier 40, therefore, the heavier contaminants are separated from the lighter contaminants, i.e. larger contaminants, such as for example chips, are separated from smaller contaminants, such as for example dusts and smaller chips. The grain size or particle size up to which, for example, aluminum chips are passed upward through the air classifier 40 depends on the level of the vacuum and therefore also on the position of the throttle flap 43 in the feed line 42. The larger or coarser chips 32 which are not entrained by the flow drop downward in the air classifier and can be transferred via a star feeder 50, which is arranged in the air classifier and in the present case is equipped with a star wheel 52, into a discharge tube 54 and are then collected in a chip container 56. A rotational-speed monitor, which is present in the star feeder 50, for the star wheel 52 monitors the functioning of the star feeder 50.

In the chip container 56 there is a level sensor 57 which is used to monitor the level of chips 32 in the chip container 56, to ensure that it is impossible for too many chips 32 to be introduced into the chip container 56.

A nonreturn flap 102, which prevents pressure waves resulting from any deflagrations which may occur in the interior space 28 of the filter housing 26 from being able to propagate back into the preliminary separator 13, is fitted in the feed line 42 between the throttle flap 43 and the filter housing 26. Further nonreturn flaps 104, 106 of this type are present in the suction tube 14 and/or in the exhaust-air line 80. The nonreturn flaps 102, 104, 106 close off the corresponding lines 42, 14, 18 in each case in the direction of flow leading away from the filter housing 26, i.e. back into the preliminary separator 13 and into the suction tube 14, and onward into the exhaust-air line 80.

On the one hand, dust-laden air 12.1. flows through the inner tube 18 into the interior space 28. Furthermore, untreated air 12.2, which may be laden not only with dusts but also with relatively light chips 38, flows through the feed line 42. These two untreated-air streams 12.1 and 12.2 mix with one another in the interior space 28 to form a gas-air mixture referred to as untreated air 12.3.

This untreated air 12.3 is mixed with additive particles 60 which are blown out of the dust container 64 positioned beneath the filter housing 26 into the interior space 28 and onto the filter plates 30. Loading the filter plates 30 with additive particles 60 of this type is also referred to as the inerting of the filter plates 30.

This inerting renders the untreated air 12.3 nonexplosive. The process dust which forms when the untreated air 12.3 is mixed with additive particles 60 at the filter plates 30 and drops downward into the dust container 64 when the additive particles are cleaned off the filter plates 30 is nonexplosive.

The filter housing 26 has a funnel 27, which narrows conically in the downward direction, as its base. The lower, relatively small opening edge 29 of the funnel 27 is connected via a line section 27.1 to an elastic sealing gasket 31 which is connected in a gastight manner to the dust container 64.

A shut-off slide 33 is fitted in the region of the lower opening edge 29 of the funnel 27. In its closed position, this shut-off slide 33 closes the funnel 27 and therefore the base of the filter housing 26, so that the dust container 64 can then be detached from the filter housing 64, removed and replaced with a new dust container. The connection between the filter housing 26 and the dust container 64 may be of any desired form. In this context, it should be ensured that the dust containers 64 can in each case be exchanged and that the dust container 64 which is in each case connected to the filter housing 26 is connected in a dust-tight and gastight manner.

The dust container 64 is both a storage container for the additive particles 60 and a receiving container for the no longer explosive process dust which has been shaken off the filter plates 30.

The dust container 64 is closed off by a cover 110 which is connected in a gastight manner to the elastic sealing gasket 31.

A sintered base 134 is formed as an intermediate base at a distance above the base 132 of the dust container 64. A compressed-air line 138, which is connected to a compressed-air source 139, opens out into the space 136 formed between the base 132 and the sintered base 134. The quantity and strength of the compressed air can be controlled in the compressed-air line 138 using an electrically actuated solenoid valve 142. The flow of compressed air into the space 136 which is in each case desired can be monitored by means of a compressed-air monitoring device 144, which is arranged in the compressed-air line 138 between the solenoid valve 142 and the dust container 64 and operates with limit contacts. Should the actual flow of compressed air deviate from the desired flow of compressed air, the separation apparatus concludes that there is a fault.

In the middle region of the sintered base 134 there is an aperture 150 which is filled by a tube section 152 which is in each case open at the end sides. Slide arrangements may be fitted in the tube section 152 in order to allow variable setting of the opening cross section of the tube.

Above the sintered base 134, there are additive particles 60 in the container 64. In the present case, these particles consist of calcium carbonate ($CaCo_3$) and of silicon dioxide ($SiO_2$).

In the container 64 there is a funnel 160 which is positioned with its smaller opening 158 facing upward. An annular gap 166 is formed between the lower edge 162 of the funnel 160, surrounding the larger opening 164 of the latter, and the sintered base 134.

When the separation apparatus 10 is operating, compressed air which has flowed into the space 136 flows upward through the tube section 152 to an increased extent. Outside the tube section 152, the permeability of the sintered base 134 is lower than in the opening cross section of the tube section 152. Consequently, there is an increased flow of air, as indicated by arrow 170, in the funnel 160. This flow of air is stronger than the flow of air corresponding to arrows 172 in the annular region between the outer wall of the dust container 64 and the tube section 152. Consequently, there is a flow of air from the annular space 176 which is present outside the funnel 160 through the annular gap 166 into the funnel interior 178 (arrow 174). The compressed air flowing through the sintered base fluidizes the particle streams which are present above the sintered base in such a manner through the region of the sintered base 134 that a flow of air corresponding to arrows 170, 174 is formed in the region of the funnel 160. Relatively load-free additive particles are guided upward onto the filter plates 30 of the filter housing 26 as indicated by arrow 170. At the filter plates, the untreated air 12.3 which is to be purified and comprises the untreated-air constituents 12.1 and 12.2, meets these fluidized particles. During cleaning of the filter plates, the dirt particles from these untreated-air and additive particle constituents, referred to as process dusts, drop downward into the dust container 64. On account of the relatively small opening 158 of the funnel 160, these dirt particles as far as possible drop into the annular space 176 of the container 64. During a long operating period, the particle flow defined by the arrow 170 is initially relatively free of contaminating particles, and as the operating time continues is gradually less free of contaminating particles which, by contrast, are present to an increased extent in the annular space 176.

The effect of the small funnel opening 158 is not only that the dirt particles formed during cleaning do not drop directly back into the funnel, but also to form a type of nozzle for the particles flowing upward, so that the velocity of the gas streams of the gas flow defined by the arrow 170 is expediently increased. As a result, the additive particles are entrained well up into the interior space 28 of the filter housing 26. This allows optimum loading of the filter plates 30 with the additive particles 60.

A level sensor 90 is fitted in the upper region of the container 64. This level sensor 90 indicates the maximum level of the particles present in the container 64. The loading operation can be interrupted by means of the level sensor.

When the separation operation commences, there is an extremely low level of particles in the container 64. This minimum level is predetermined by the additive particles present in the container 64 alone and is monitored by a level-reporting means 91. During the loading operation, additional dirt particles, consisting of the process dust, are added to these additive particles.

This process dust contains the aluminum dusts and aluminum chips which have been separated out of the untreated air. As a result, the level inside the container 64 rises until it has reached its upper level defined by the level sensor 90. This upper level represents a corresponding limit mixing ratio at which a maximum permissible aluminum dust content is reached in the dust container 64. When this limit ratio is reached, the container 64 has to be exchanged for a new dust container containing unused additive particles 60. Tests have shown that to ensure a nonexplosive aluminum-air mixture, the aluminum dust content must be less than 16 percent by weight. To maintain a sufficient safety margin, the maximum content of aluminum dust by weight in the mixture is set at 10 percent by weight. When this limit value is reached, the installation establishes that there is a fault and an automatic shutdown of the installation is initiated.

Therefore, the dust container 64 can be used, and therefore the loading operation continued, until a certain saturation of the action of the additive particles has occurred.

Before starting to use a container 64, the latter is filled with additive particles up to a predetermined mark. This quantity is selected in such a way that the mixture consisting of additive particles and introduced aluminum dust still does not represent a combustible mixture when the upper level-monitoring means 90 is reached.

In the present example, monitoring of the weight of the dust container 64 represents the most important checking means for ensuring that the cleaning apparatus 10 operates safely and reliably.

This weight monitoring is effected by means of a weighing device 120 which has two weighing devices 122, 124. The weighing results from the two weighing devices 122, 124 are checked for plausibility. The corresponding weight of the dust container 64 results from adding the partial weights of the two individual weighing apparatuses 122, 124. Should unplanned deviations in the ratio of these two partial weights to one another by more than a predetermined tolerance value occur, a fault message is emitted. This weight measurement takes into account the fact that the dust container 64, which is secured in a dust-tight manner to the housing 26, is lifted slightly by the vacuum in the filter housing 26, which leads to an apparent reduction in weight. This apparent reduction in the weight of the container 64 is taken into account by a pressure-compensation measurement.

A sensor 128, which is used to measure the electric charge of the additive-dust mixture blown upward out of the container 64, is positioned in the line section 27.1 which is present between the dust container 64 and the filter housing 26. The electric charge of this additive-dust mixture is directly related to the consistency of the mixture introduced. Therefore, the sensor 128 can monitor the loading of the filter plates 30 with the additive particles present in the dust container 64.

Differential pressure monitoring devices for the filter plates 30 are not shown in the drawing.

A heat indicator 118 and an air-flow monitoring means 119 are fitted in the exhaust-air line 80. While the heat indicator 118 can be used to record an undesirable rise in the temperature of the untreated air 12 and clean air 24 flowing through the separation apparatus 10 at an early stage, the air-flow monitoring means 119 checks the power and state of the fan 22. The untreated air 12 is sucked through the entire separation apparatus 10 and blown out as clean air 24 by means of the fan 22 fitted in the exhaust-air line 80.

When a dust container 64 is being exchanged for a new dust container, the filter housing 26 is closed by the shut-off member 33. Since exchanging the dust container 64 may only take a relatively short time, such as at most 15 minutes, the separation apparatus and therefore the fan 22 can continue to operate in full during this time. If this period of time which is predetermined for the exchange of a dust container 64 is exceeded, the installation concludes that there is a fault.

To maintain the operational reliability of the separation apparatus 10, there is a level sensor 116 in the air classifier 40, which is used to monitor the quantity of coarse chips 32 collecting in the base region of the air classifier 40. The star feeder 50 is actuated as a function of the level sensor 116. The functioning of the star feeder 50 and therefore the functioning of its central wheel 52 is monitored by means of a rotational-speed monitoring means, which is not shown in more detail in the drawing.

The filter plates 30 are successively cleaned down at predetermined intervals by means of a cleaning device 86, which is diagrammatically indicated in FIG. 1. In the present example, a cleaning cycle of this type is provided approximately three times per operating hour. This cleaning device 86 has a compressed-air line 138.1, which is likewise connected to the compressed-air source 139. Air pressure surges can be directed from the inside onto the respective individual filter plates 30 via this compressed-air line 138.1, which is opened or closed by means of an electrically actuated solenoid valve 146. These compressed-air surges cause the contaminants adhering to the outside of the filter plates to be shaken off. This cleaning technique is known per se.

As an alternative or in addition, the cleaning may also be carried out as a function of the degree of soiling of the filter plates 30. The pressure on the clean-air side and on the untreated-air side of the filter housing 26 could be determined by means of pressure sensors (not shown in the drawing). Should the pressure difference exceed a predetermined level, this would mean excessive soiling of the filter surface of the filter plates 30. The solenoid valve 146 would then be opened and the filter plates 30 would successively be cleaned down by compressed-air surges.

The invention claimed is:

1. A method for separating dust constituents out of an explosive dust-air mixture comprising,
   a) flowing the dust-air mixture through a filter housing, the filter surfaces of which are cleaned down from time to time,
   b) dropping dust produced during the cleaning of the filter surfaces into an exchangeable dust container, which contains inert additive particles, where it is mixed with the additive particles,
   c) applying, before the start of a separation operation which uses the contents of a dust container for the first time, additive particles from the dust container to the filter surfaces,
   d) determining the weight of the dust container,
   e) commencing the separation operation, in which the dust constituents from the dust-air mixture settle on the filter surfaces covered with additive particles and when the filter surfaces are cleaned drop into the dust container as process dust, thereby increasing the weight of the dust container,
   f) monitoring the increase in the weight of the dust container occurring in method step e), and
   g) terminating the further use of the dust container when the increase in weight recorded in method step f) compared to method step d) has reached a defined value or when a defined service life of the dust container has been reached.

2. The method as claimed in claim 1, wherein aluminum dusts and aluminum chips are present as dust constituents.

3. The method as claimed in claim 1, wherein the main constituents of the additive particles are calcium carbonate ($CaCo_3$) and silicon dioxide ($SiO_2$).

4. The method as claimed in claim 1, wherein
the weight of the dust container is determined prior to commencement of method step c),
method step e) is only commenced when the weight of the dust container has decreased by a defined amount.

5. The method as claimed in claim 1, wherein
in method step c) additive particles are applied to the filter surfaces for a defined period of time, and only after this period of time is method step d) commenced.

6. The method as claimed in claim 1, wherein
a plausibility check is carried out on weighing results relating to the weight of the dust container.

7. The method as claimed in claim 6, wherein
the container is in each case weighed by means of a plurality of weighing devices simultaneously, so that the weight of the dust container results from the sum of the partial weights of the individual weighing devices,
in which unplanned deviations in the ratio of the partial weights with respect to one another which result, by more than a predetermined tolerance value, cause a fault message to be emitted.

8. The method as claimed in claim 1, wherein
the filter surfaces are cleaned down prior to commencement of method step c).

9. The method as claimed in claim 1, wherein
the filter surfaces are cleaned in a plurality of cleaning cycles, in particular approximately three times per operating hour,
after each cleaning cycle additive particles from the dust container are applied to the filter surfaces, specifically
either for a defined period of time
or until the weight of the dust container has decreased by a defined amount.

10. The method as claimed in claim 1, wherein
while a dust container which has been filtered in maximum extent with process dust is being exchanged for a new dust container which does not yet contain any process dust, the filter housing is closed in its transition region to the dust container, and the cleaning operation is continued for a predetermined period of time without a dust container.

11. The method as claimed in claim 10, wherein
a fault message is issued if a set period of time for the exchange operation is exceeded.

12. The method as claimed in claim 1, wherein
compressed air is blown into the dust container, and as a result additive particles which are present in the dust container are blown into the filter housing and onto the filter surfaces.

13. The method as claimed in claim 12, wherein
the operating pressure of the compressed air is monitored and a fault message is issued if pressure limit values are exceeded or undershot.

14. The method as claimed in claim 1, wherein
there is a device for monitoring the flow of additive particles out of the dust container.

15. The method as claimed in claim 14, wherein,
a fault message is issued if additive particles do not flow out or do so only to an insufficient extent.

16. The method as claimed in claim 1, wherein
a fan is used to discharge the clean air leaving the filter housing,
the power of the fan is monitored and a fault message is issued if it drops below a predetermined limit value.

17. The method as claimed in claim 16, wherein
a fan, in particular the fan used to discharge the clean air, is used to pass the dust-air mixture through the filter housing.

18. The method as claimed in claim 17, wherein
the dust-air mixture is only introduced into the filter housing when the fan(s) have reached their working point.

19. The method as claimed in claim 17, wherein
if the introduction of the dust-air mixture into the filter housing is interrupted, the fan(s) continue to operate for a certain time.

20. The method as claimed in claim 1, wherein
the pressure on the untreated-gas side and on the clean-gas side of the filter surfaces is determined, and a fault message is issued if predetermined pressure limit values are exceeded.

21. The method as claimed in claim 11 or 13 or 16 or 20, wherein
in the event of a fault message the installation producing the dusts is shut down and the fan used to discharge the clean air leaving the filter housing continues to be operated for a certain time.

22. The method as claimed in claim 1, wherein
first of all the chips are separated out of the dust-air mixture, and then the remaining dust-air mixture is fed to the filter housing.

23. An apparatus for carrying out a method for separating dust constituents out of an explosive dust-air mixture comprising,
a filter housing with at least one filter element having filter surfaces, the dust-air mixture being introduced into the filter housing as untreated air and being discharged again from the filter housing as clean air,
a cleaning device for the filter surfaces,
a dust container, which can be connected up in a gastight manner, contains inert additive particles, into which the process dust produced as a result of the filter surfaces being cleaned down drops and from which the additive particles can be blown onto the filter surfaces by means of compressed air, and
a weighing device for the dust container including at least two weighing apparatuses.

24. The apparatus as claimed in claim 23, wherein
there is a device for determining the overall weight of the dust container from the partial weights of at least two weighing apparatuses.

25. The apparatus as claimed in claim 23 or 24, wherein
there is a sintered base in the dust container, which serves as an intermediate base and is present as a supporting base for inert additive particles,
the inlet opening in the dust container for the introduction of compressed air is such that the compressed air can be passed into the space between the sintered base and the base of the dust container and can be passed through the sintered base,
there is a funnel above a subregion of the sintered base, the funnel being oriented with its lower edge, which surrounds its larger opening, facing toward the sintered base,
there is an annular gap between this lower edge of the funnel and the sintered base, in order to allow particles from the layer of particles on the supporting base to flow into the region of the funnel from outside the funnel,
within the subregion enclosed in a bell-shaped manner by the funnel, there is a base region of the sintered base which has a greater permeability to air than the remaining region of the sintered base.

26. The apparatus as claimed in claim 23, wherein
there are devices for checking the weighing results of the individual weighing devices.

27. The apparatus as claimed in claim 23, wherein
in the base region of the sintered base there is an aperture or tube piece which is of a sufficient size to provide a greater permeability to air than in the remaining region of the sintered base,
the aperture or the tube piece is aligned with the upper, smaller opening of the funnel.

28. The apparatus as claimed in claim 25, wherein
the funnel is completely inside the dust container.

29. The apparatus as claimed in claim 23, wherein
there is a pressure-exerting apparatus for releasably coupling the dust container to the filter housing in a gastight manner.

30. The apparatus as claimed in claim 23, wherein
a cyclone separator is connected upstream of the filter housing in terms of flow,
there is an air classifier between the cyclone and filter housing in terms of flow, such that relatively heavy dust constituents separated out of the cyclone can be introduced into the air classifier, and a predetermined proportion of these relatively heavy dust constituents can be introduced through the air classifier into the filter housing.

31. The apparatus as claimed in claim 30, wherein
the cyclone separator, the air classifier and the filter housing are structurally combined to form a compact unit.

32. The apparatus as claimed in claim 30, wherein
the cyclone separator includes at least an inner and an outer tube,
a suction tube for the solids-gas mixture opens out tangentially into the outer tube,
the inner tube, which is open on both sides, opens out into the filter housing,
a connection line, which leads to the air classifier, is connected to a line connection piece which is present tangentially at the outer tube,
the line connection piece is present in the outer tube for separating off heavier dust constituents from lighter dust constituents.

33. The apparatus as claimed in claim 30, wherein
it is possible to produce a flow of air through the air classifier in the opposite direction to the force of gravity of the dust constituents,
this oppositely directed flow of air, by means of an air-pressure vacuum control, is present in a line connection which is connected on the exit side of the air classifier and leads to the filter housing.

34. The apparatus as claimed in claim 30, wherein
in the base region of the air classifier there is a star feeder for discharging solids which have settled in the base region.

* * * * *